United States Patent Office 2,980,906
Patented Apr. 18, 1961

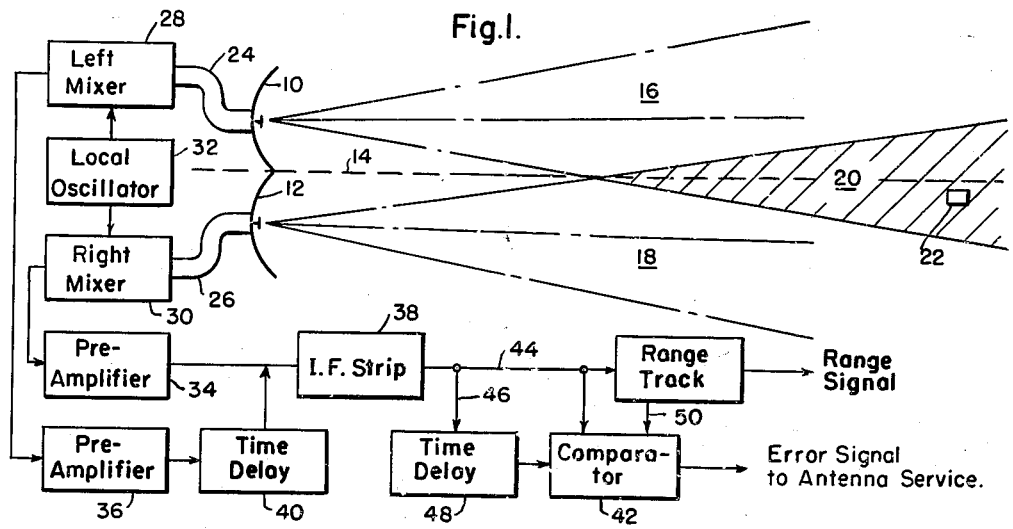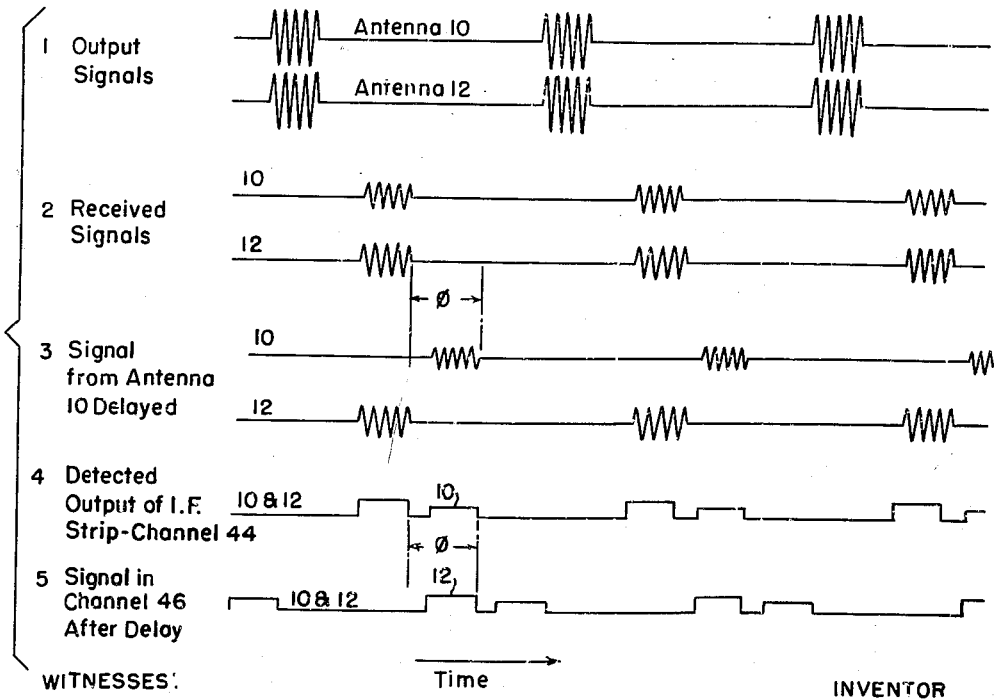

2,980,906

MONO-PULSE RADAR SYSTEM

Cyril E. McClellan, Glen Burnie, Md., assignor to Westinghouse Electric Corporation, East Pittsburgh, Pa., a corporation of Pennsylvania Filed July 19, 1954, Ser. No. 444,057

3 Claims. (Cl. 343—16)

This invention relates to radar systems and, more particularly, to radar systems in which the complete angular position of a target is determined with a single energy pulse.

In conventional radar systems, conical scanning is often used to obtain the angular position of a target with respect to the boresight axis of the radar antenna. Radiation from the antenna is in the form of a narrow pencil beam which is made to rotate circularly about the boresight axis so that the radiation pattern is in the form of a cone whose vertex is the center of the radiating antenna. By recording the position of the radiated energy pulses which are reflected by a target somewhere in the 360° circular path traveled by the beam, the angular position of that target may be determined. In conical scanning, the angular error signal (i.e. the signal indicating the angular position of a target) is generally cluttered with noise which results from the amplitude variations (between reflected pulses) caused by variation in the power of the transmitted pulses, by changing atmospheric conditions, by propeller modulation, and by changing target apsect. In the conical scanning system, which measures the angular position of a target by the amplitude variation of the error signal, there is no effective way of separating the amplitude variations of the error signal due to true angular pointing from those described above. Any scheme of reducing noise by reducing amplitude modulation also effects the desired error signal.

The mono-pulse system presents a means for eliminating most of the amplitude noise by obtaining complete angular information from a single radiated energy pulse. This is accomplished by using at least two antennas rather than one as in the conventional conical scanning system. The antennas are spaced apart at equal distances from a common center point by D wave lengths and are "aimed" or pointed in slightly divergent directions so that their cone-shaped lobes (radiation beams) overlap. Any target in the field formed by the overlapping lobes will send reflected energy pulses back to the respective antennas. Unless the target lies at equal distances from the two antennas, the amplitudes and phases of the reflected energy waves arriving at the antennas will vary. By comparing the amplitude or phase differences, an angular error signal is derived whose magnitude and polarity indicates target distance and direction from the center point between the antennas. The mono-pulse system, therefore, determines target angularity by comparing the amplitudes of received signals at a plurality of antennas whereas the conical scan system determines angularity by noting amplitude variations in reflected signals as the antenna and lobe travel through 360°.

In existing mono-pulse systems of which I am aware, the signals received at the two antennas are combined while at the RF level in a wave guide and are then separated into two channels by means of any suitable microwave network such as a magic tee. The first or "sum" channel contains the sum of the signals received by the separate antennas and the second or "difference" channel contains the differences of the signals. By amplification in separate channels and subsequent comparison an angular error can be ascertained.

The mono-pulse system just described has certain disadvantages. Among these is the disadvantage of having a separate radio receiver and wave guide system for each antenna. If only one receiver were used in the conventional system, interference would result between the signals received from the different antennas. The various receivers and wave guides must be identical in gain and other characteristics. Identical characteristics, however, are extremely difficult to obtain. I have, therefore, provided a mono-pulse system in which a single receiver may be used for all of the antennas. This is accomplished by feeding only one signal to the receiver at any one time and delaying the other signals so that they are fed to the receiver in succession. After the signals are detected in the receiver, every signal but the last is delayed in inverse order so that all signals are again in their original phase relationships. It will thus be seen that the difficulty of identical receiver characteristics is overcome in the present invention by using a single receiver for all of the antennas.

Detailed operation of the above-described system together with other objects and features of the invention will become apparent from the following description. In the drawings which accompany the description:

Figure 1 is a schematic diagram showing one embodiment of my invention; and

Fig. 2 is a graphical illustration of the operation of the invention shown in Fig. 1.

In Figure 1 the radiation field formed in a mono-pulse radar system is disclosed. Two antennas or feed horns 10 and 12 are spaced at equal distances from a common center line 14. The radiated lobes or fields 16 and 18 overlap to form a combined field 20. If a target 22 is found within the combined field, simultaneous pulses emanating from the antennas 10 and 12 will be reflected back to their respective antennas. However, since in the present illustration the target is nearer to the center of the beam of antenna 12 than antenna 10, the reflected pulses arriving at antenna 12 will be greater in amplitude than those arriving at antenna 10. Likewise, the signal received at antenna 12 will lead in phase to that received at antenna 10. By comparing the difference in amplitude or phase between the two received signals, an angular error signal can be derived whose magnitude and polarity will indicate the position of target 22 with respect to center line 14.

In the illustration of Fig. 1, the transmitting apparatus of the radar system is omitted, only the receiving portion being disclosed. Leading from antennas 10 and 12 are a pair of wave guides 24 and 26. In the present instance the wave guides are not connected to a magic tee coupler as in most conventional mono-pulse systems, but they may be, if so desired. The receiver of the invention is of the superheterodyne type in which the frequency of an incoming signal is heterodyned to a new radio frequency (called the intermediate frequency), then amplified, and finally detected. Received signals from antennas 10 and 12 are fed into first and second mixer circuits 28 and 30. In these circuits the incoming signals received from the antennas are mixed with the output of local oscillator 32 to produce the intermediate frequency referred to above. The outputs of the mixer circuits are amplified in amplifiers 34 and 36 and finally applied to IF strip 38 to be detected. A time delay circuit 40 is interposed between amplifier 36 and IF strip 38. This type of circuit (i.e., the delay circuit) is well known in the art and, as its name implies, serves to delay the signal or pulse received from antenna 10 by, say, 2 microseconds. Since the pulse duration is usually somewhere in the range of 1 microsecond and the time elapse between pulses is much greater than this value, the pulses from antennas 10 and 12 will be detected in succession by IF strip 38 without interference. The detected output of the IF strip is then split and applied to a comparator 42 through channels 44 and 46. One-half of the detected output is delayed 2 microseconds (the same as before) by a second delay circuit 48 before going to the comparator so that the compared signals assume the relationship they were in when first received from their respective antennas. That is, the signal from antenna 10 and that from antenna 12 have each had one delay and hence arrive simultaneously at the comparator.

Operation of the system can best be understood by reference to Fig. 2 which graphically illustrates the time relationships of the pulsed signals radiated from antennas 10 and 12 at five different stages of the detection-comparison process. It can be seen that the output signals radiated from antennas 10 and 12 at stage 1 are in phase and of the same amplitude. However, since target distance and angle deviation from antenna 10 is greater than that from antenna 12, the received signals at antenna 10 will lag in phase to those received at antenna 12 and will have a smaller amplitude (stage 2). This leg, although present, is too slight to be detected in the drawing. To prevent interference in the single detector of the system the signal from antenna 10 is delayed in the circuit 40 by an amount equal to $\phi$ (stage 3). The delayed and undelayed signals are then detected by IF strip 38 in succession. The output of the IF strip in channel 44 is a combination of the detected pulses received from antennas 10 and 12 (stage 4). This output is divided between channels 44 and 46 and applied to comparator 42. The signals appearing in channel 46 are delayed again in delay circuit 48 by an amount equal to $\phi$ (stage 5). The signals from antenna 10 appearing in channel 44 are now in their original phase relationship with respect to the signals from antenna 12 appearing in channel 46. Since the difference in signal amplitude is proportional to the phase difference between these signals they can now be compared in either phase or amplitude to produce an output signal which is proportional to the difference in phase or amplitude.

Also connected to channel 44 is a range track circuit 46 which indicates the range (distance) of the target by timing the delay of returned echoes. The range track circuit also serves to supply a pulsed voltage to the comparator 42 through path 50 to render the same operative only at the appropriate times. In this way the comparator is rendered operative only when pulses from the two antennas in their respective channels arrive at the comparator at the same instant.

The output of the comparator is in the form of an error signal whose magnitude and polarity depends upon the amplitude or the phase difference between the signals received by the antennas, depending upon whether amplitude or phase comparison is used. The error signal is applied to a servo motor which controls the direction of the antenna. If a target is, for example, to the left of the center line between the antennas, the error signal will be such as to shift the antennas to the left until the target is in line with center line 14. In this manner the antennas will automatically follow the target as it moves about in the combined fields radiated by the antennas.

Although this invention has been described in connection with only two antennas, it will be understood by those skilled in the art that a greater number of antennas can be used by simply adding another pair of time delay circuits, one on each side of the IF strip, for each antenna added to permit tracking in more than one plane.

I claim as my invention:

1. In a radar system of the type which determines target aspect by comparing the target returns of pulsed signals which are simultaneously radiated from two antennas spaced from each other a predetermined distance and having overlapping patterns of radiation, the combination of a wave guide for each of said antennas, means connected to said wave guides for heterodyning the signals received at said antennas to a new frequency, means for delaying the heterodyned signals emanating from one of said antennas, a single receiver device for detecting the delayed and undelayed signals in succession, a pair of electron paths connected to the output of said detecting means so that the detected signals will appear in both of said paths, means included in one of said paths for delaying the signals appearing therein by an amount equal to the time delay effected by the first of said delaying means, and a comparator for comparing the phase differences of signals in the respective paths to thereby produce an output signal whose magnitude and polarity depends upon the relative phases of the compared signals.

2. In a radar system of the type which determines target aspect by comparing the target returns of pulsed signals which are simultaneously radiated from two antennas spaced from each other a predetermined distance and having overlapping patterns of radiation, the combination of means for heterodyning signals received by said antennas to a new frequency, means for delaying the heterodyned signals received by one of said antennas, a receiver device for detecting the delayed and undelayed signals in succession, means for dividing the detected output of said receiver device into two channels, a device included in one of said channels for delaying signals appearing therein by an amount equal to the time delay effected by the first of said delaying means, and means for comparing the signals in said channels to produce an output signal whose magnitude and polarity is dependent upon the difference in amplitude between the signals received by said antennas.

3. In a radar system of the type which determines target aspect by comparing the target returns of pulsed signals which are simultaneously radiated from two antennas spaced from each other a predetermined distance and having overlapping patterns of radiation, the combination of a wave guide for each of said antennas, means connected to said wave guides for heterodyning the signals received at said antennas to a new frequency, means for delaying the heterodyned signals emanating from one of said antennas, a single receiver device for detecting the delayed and undelayed signals in succession, means forming a pair of signal paths connected to the output of said receiver device whereby the detected signals will appear in both of said paths, means included in one of said paths for delaying the signals appearing therein by an amount equal to the time delay effected by the first-named delaying means, and a comparator for comparing the amplitudes of the signals appearing in the respective paths to produce a comparator output signal whose magnitude and polarity depends upon the relative amplitudes of the compared signals.

References Cited in the file of this patent
UNITED STATES PATENTS

| | | |
|---|---|---|
| 2,208,349 | Ulbricht | July 16, 1940 |
| 2,424,984 | Hoffman | Aug. 5, 1947 |
| 2,458,280 | Lindenblad | Jan. 4, 1949 |
| 2,509,207 | Busignies | May 30, 1950 |
| 2,716,235 | Isbister | Aug. 23, 1955 |
| 2,721,320 | Sommers | Oct. 18, 1955 |